United States Patent
Hammond-Smith et al.

(10) Patent No.: US 6,924,861 B2
(45) Date of Patent: Aug. 2, 2005

(54) BIREFRINGEMENT FILM CONTAINING LIQUID CRYSTAL MATERIAL HAVING MULTI DOMAINS WITH SPLAYED STRUCTURE

(75) Inventors: Robert Hammond-Smith, Dammerham (GB); John Patrick, Poole (GB); Donald Gordon Graham, Corfe Mullen (GB)

(73) Assignee: Merck Patent GmbH, Darmstadt (DE)

( * ) Notice: Subject to any disclaimer, the term of this patent is extended or adjusted under 35 U.S.C. 154(b) by 59 days.

(21) Appl. No.: 10/358,346

(22) Filed: Feb. 5, 2003

(65) Prior Publication Data

US 2003/0178609 A1 Sep. 25, 2003

(30) Foreign Application Priority Data

Feb. 6, 2002 (EP) .............................. 02002007

(51) Int. Cl.⁷ ................... G02F 1/1337; G02F 1/1335; C09K 19/52; C09K 19/00
(52) U.S. Cl. ................ 349/129; 349/113; 349/117; 252/299.01; 428/1.1
(58) Field of Search ................ 349/113, 117, 349/129; 252/299.01; 428/1.1, 1.3; 359/15

(56) References Cited

U.S. PATENT DOCUMENTS

| | | | |
|---|---|---|---|
| 5,619,352 A | | 4/1997 | Gunning et al. |
| 5,670,083 A | * | 9/1997 | Akashi et al. .......... 252/299.01 |
| 5,978,055 A | | 11/1999 | Van Haaren et al. |
| 6,144,428 A | * | 11/2000 | Schadt et al. ................ 349/113 |
| 6,217,948 B1 | | 4/2001 | Verrall et al. |
| 6,291,035 B1 | | 9/2001 | Goulding et al. |
| 6,319,963 B1 | | 11/2001 | Verrall et al. |
| 6,369,869 B2 | * | 4/2002 | Schadt et al. ................ 349/129 |
| 6,496,287 B1 | * | 12/2002 | Seiberle et al. ................ 359/15 |
| 6,593,987 B1 | * | 7/2003 | Walton et al. ............... 349/129 |
| 2004/0085487 A1 | * | 5/2004 | Chen et al. .................... 349/5 |

FOREIGN PATENT DOCUMENTS

| | | |
|---|---|---|
| DE | 4405316 A1 | 8/1995 |
| DE | 19504224 A1 | 8/1995 |
| DE | 4408171 A1 | 9/1995 |
| EP | 0261712 A1 | 3/1988 |
| EP | 0397263 A1 | 11/1990 |
| GB | 2280445 A | 2/1995 |
| GB | 2324382 A | 10/1998 |
| GB | 2328180 A | 2/1999 |
| GB | 2330360 A | 4/1999 |
| GB | 2357061 A | 6/2001 |
| WO | WO 93/22397 A1 | 11/1993 |

* cited by examiner

Primary Examiner—Tarifur R. Chowdhury
(74) Attorney, Agent, or Firm—Millen, White, Zelano, Branigan, P.C.

(57) ABSTRACT

A birefringent film comprising at least one birefringent layer of liquid crystal material forming multi domains with a splayed structure may be coated onto a reflective substrate, e.g., with an aluminium surface. The birefringent film is particularly suited for decorative, security, authentification or identification applications.

38 Claims, No Drawings

BIREFRINGEMENT FILM CONTAINING LIQUID CRYSTAL MATERIAL HAVING MULTI DOMAINS WITH SPLAYED STRUCTURE

FIELD OF THE INVENTION

The invention relates to a birefringent film comprising at least one birefringent layer of liquid crystal material. The invention further relates to a method of providing such a birefringent film and to the use of the birefringent film for decorative, security, authentification and/or identification applications. Furthermore, the invention relates to a security, authentification or identification marking or device, to a document of value, to a hot stamping foil, to a reflective foil and to an optical data storage device comprising the birefringent film according to the invention.

BACKGROUND AND PRIOR ART

Films of polymeric liquid crystalline material are well known. GB 2 324 382 (U.S. Ser. Nos. 09/059,247 and 09/484,259) discloses a liquid crystal film with homeotropic alignment. With the described method, nematic and smectic A liquid crystals can be quickly aligned on plastic substrates, whereby roll to roll coating is applicable. The use of an aligning layer comprising a surfactant being fixed in a matrix of a polymeric liquid crystalline material is described. According to an alternative embodiment, the substrate is coated with aluminium or sufficiently smooth $Al_2O_3$ to achieve a homeotropic alignment of the liquid crystal material. The resulting uniformly homeotropic aligned films can be used in electrooptical displays, optical compensation layers or as active switching layer.

The use of birefringent films as security devices has been reported in prior art. A hot stamping foil for security applications comprising a liquid crystal material is known from GB 2 357 061. The liquid crystal layer is applied onto a reflective layer, which exhibits on its opposite surface a hot melt adhesive. The liquid crystal layer is protected by a lacquer. The whole arrangement of layers is carried by a support layer. A wax layer between the support layer and the lacquer layer enables a release of the birefringent layer arrangement by applying heat. The liquid crystal material is a nematic or smectic material with a planar, tilted, splayed or homeotropic orientation. The liquid crystal layer comprises a linear or crosslinked liquid crystal polymer with macroscopically uniform orientation. Metal films or flakes are used as a reflective layer. The hot stamping foil can be applied on substrates to authenticate and prevent counterfeiting of documents of value, e.g., of banknotes, credit cards or ID cards. The transmission or reflection effect of the polarized light by the birefringent material can be seen using linear polarizers. Incorporation of dichroic dyes leads to additional color effects.

The use of uniformly aligned nematic liquid crystals in security applications has a major drawback. Due to the uniform alignment only one colour is seen when viewed through a polarizer. This effect could be copied by using any reflective background and a layer of a birefringent material.

A solution of this problem was proposed by the GB 2 330 360 (U.S. Pat. No. 6,217,948), which describes a polymer film with a helically twisted molecular structure exhibiting at least two maxima of a reflection wavelength. The film is obtained by polymerizing a thermochromic mesogenic composition at varied temperatures. Since the temperature is changed during polymerization, the thermochromic polymerizable composition undergoes a change of the helical pitch and therewith of the reflection maximum. The various pitch lengths are fixed by the polymerization reaction and a polymer film is obtained that exhibits, depending on the type, degree and speed of temperature variation, a range of reflection colours. Thus, a disadvantage of this method is the requirement of a precise control of the temperature and its change during the polymerization process An alternative approach is disclosed in the GB 2 328 180 relating to a security device comprising a birefringent film having regions of different thickness, such that when the material is viewed through a polariser, a pattern is exhibited. The birefringent film is, e.g., a stretched polymer film like a PET film. The pattern is achieved, e.g., by forming recesses in the birefringent film, or by bonding the film to a higher melting point layer as supporting layer and reducing the thickness or destroying the birefringence in selected regions of the birefringent film. Destruction of the birefringence is achieved, e.g., by melting, hot stamping, thermal printing or laser writing. Reduction of the film thickness is achieved, e.g., by removing parts of the film or by laser writing. The higher melting point supporting layer then holds the partially destructed birefringent film in place. GB 2 328 180 further reports that a reflective layer can be applied to the birefringent film after provision of the pattern, e.g., by metallisation or printing of a reflective material.

The device according to GB 2 328 180 has several drawbacks. For example, its manufacture is complicated and requires a series of manufacturing and processing steps like forming the pattern on the birefringent film, lamination to a high melting point supporting layer and application of the reflective layer. The methods of forming the pattern are also complicated and require additional technical effort and equipment, like the use of high temperatures or lasers. Furthermore, stretched plastic films used as birefringent layers as described in GB 2 328 180 generally exhibit only moderate birefringence. Therefore, usually a high film thickness is required to achieve a satisfying optical effect. The film thickness is further increased by the use of the supporting layer. Thus, GB 2 328 180 reports devices with a combined film thickness of the birefringent and supporting layer of about 15 µm. Such a high thickness is critical especially for applications in the security sector, like, e.g., security markings to be applied on documents of value or banknotes.

AIMS OF THE INVENTION

Aim of the present invention is to provide a birefringent film, in particular for decorative, security, authentification or identification applications, that does not have the drawbacks of the prior art devices, exhibits effects difficult to counterfeit and which allows an economic fabrication even at large scales.

A further aim of this invention relates to a method of preparing a birefringent film according to this invention, which allows a fast, reliable and cheap fabrication.

A further aim of this invention is to provide an advantageous use of the birefringent film according to this invention.

Further aims of this invention relate to security, authentification or identification markings or devices, to a reflective film and to an optical data storage device, which are difficult to counterfeit.

Another aim of this invention is to provide a hot stamping foil, which is especially suited for security applications.

Other aims of the present invention are immediately evident to the person skilled in the art from the following detailed description.

SUMMARY OF THE INVENTION

An object of the present invention is a birefringent film comprising at least one birefringent layer of liquid crystal material characterized in that the liquid crystal material forms multi domains with a splayed structure.

The inventors have found that particularly striking visual effects can be achieved with a birefringent film according to the present invention. When viewing this birefringent film through a linear polariser against a reflective background or using a second polarizer patterned effects can be seen which appear to rotate as the polariser is rotated. Such effects can not be achieved with standard birefringent materials. Thus, the birefringent film can not be counterfeited or copied easily. Furthermore, the birefringent film can be fabricated economically even at large scales, in particular using printing processes. Therefore, the birefringent film is especially suited for security, authentification or identification marking, but also for decorative purposes.

Another object of the invention is a method of preparing a birefringent film according to this invention by applying a solution of a liquid crystal material onto a substrate and allowing the solvent to evaporate.

This method allows a fast, reliable and cheap fabrication of the inventive birefringent film with the advantages as described above.

Another object of the invention is the use of the inventive birefringent film in decorative, security, authentification and/or identification applications.

Another object of the invention is a security, authentification or identification marking, thread or device comprising an inventive birefringent film.

Further objects of the invention are documents of value, hot stamping foils, reflective foils and optical data storage devices, each comprising at least one film, thread, marking or device according to this invention.

Upon further study of the specification and appended claims, further objects and advantages of this invention will become apparent to those skilled in the art.

DEFINITION OF TERMS

In connection with liquid crystal layers and films as described in the present application, the following definitions of terms as used throughout this application are given.

The term 'film' as used in this application includes self-supporting, i.e., free-standing, films that show more or less pronounced mechanical stability and flexibility, as well as coatings or layers on a supporting substrate or between two substrates.

The term 'liquid crystal or mesogenic material' or 'liquid crystal or mesogenic compound' should denote materials or compounds comprising one or more rod-shaped, board-shaped or disk-shaped mesogenic groups, i.e., groups with the ability to induce liquid crystal phase behaviour. The compounds or materials comprising mesogenic groups do not necessarily have to exhibit a liquid crystal phase themselves. It is also possible that they show liquid crystal phase behaviour only in mixtures with other compounds, or when the mesogenic compounds or materials, or the mixtures thereof, are polymerized.

For the sake of simplicity, the term 'liquid crystal material' is used hereinafter for both liquid crystal materials and mesogenic materials, and the term 'mesogen' is used for the mesogenic groups of the material.

The term 'planar structure' or 'planar orientation' means that the liquid crystal director, i.e., the preferred orientation direction of the main molecular axes of the mesogens in the liquid crystal material, is substantially parallel to the plane of the film or layer. This definition also includes films wherein the director is slightly tilted relative to the film plane, with an average tilt angle throughout the film of up to 1°, and which exhibit the same optical properties as a film wherein the director is exactly parallel, i.e., with zero tilt, to the film plane.

The terms 'tilted structure' or 'tilted orientation' means that the liquid crystal director of the film is tilted at an angle θ between 0 and 90 degrees relative to the film plane.

The term 'splayed structure' or 'splayed orientation' means a tilted orientation as defined above, wherein the tilt angle additionally varies monotonuously (i.e., the tilt angle either increases or decreases within a layer) in the range from 0 to 90°, preferably from a minimum to a maximum value, in a direction perpendicular to the film plane.

The term 'direction of the splay' means the direction of the directors of the liquid crystals as projected onto the film plane. The direction of the directors of the liquid crystals varies from one side of the layer to the opposite side as the tilt angle varies. But, its projection, i.e., the direction of the splay remains about the same if only a single domain of liquid crystals is looked at.

The term 'low tilt structure' or 'low tilt orientation' means that the optical axis of the film is slightly tilted or splayed as described above, with the average tilt angle throughout the film being between 1 and 10°.

The average tilt angle $\theta_{ave}$ is defined as follows $$\theta_{ave} = \frac{\sum_{d'=0}^{d} \theta'(d')}{d}$$

wherein $\theta'(d')$ is the local tilt angle at the thickness d' within the film, and d is the total thickness of the film.

The tilt angle of a splayed film hereinafter is given as the average tilt angle $\theta_{ave}$, unless stated otherwise.

The term 'homeotropic structure' or 'homeotropic orientation' means that the liquid crystal director of the film is substantially perpendicular to the film plane, i.e., substantially parallel to the film normal. This definition also includes films wherein the director is slightly tilted at an angle of up to 2° relative to the film normal, and which exhibit the same optical properties as a film wherein the director is exactly parallel, i.e., with no tilt, to the film normal.

For sake of simplicity, a film comprising liquid crystal material with a tilted, splayed, low tilted, planar and homeotropic orientation or structure is hereinafter being shortly referred to as 'tilted film', 'splayed film', 'low tilt film', 'planar film' and 'homeotropic film', respectively.

DETAILED DESCRIPTION OF THE INVENTION

The present invention relates to a birefringent film comprising at least one birefringent layer of liquid crystal material forming multi domains with a splayed structure, i.e., the direction of the splay is not same over the whole birefringent layer as it varies from domain to domain. This random formation of splayed areas with varying directions of the splay causes a non regular pattern when viewed through a polariser against a reflective background or a second polarizer. This effect, which can not be copied easily, is particularly valuable in decorative, security, authentification or identification applications. The birefringent film and its method of preparation according to the present invention have several advantages over prior art, such as

- the birefringent material can be applied to any suitable non-porous reflective surface without prebonding to other materials,
- the birefringent material can be applied by conventional printing or coating techniques,
- the birefringent material exhibits a patterned effect when viewed through a linear polariser,
- the patterned effect appears to rotate when the polariser is rotated.

The multi domains of the liquid crystal material according to this invention consist of a multitude of adjacent areas, each showing essentially a single domain. Such a single domain area has generally a surface area of smaller than 100 mm$^2$, in particular smaller than 10 mm$^2$ or even smaller than 1 mm$^2$.

Preferred embodiments of the invention relate to a birefringent film wherein

- the liquid crystal material is a vitrified, polymerised or crosslinked liquid crystal material,
- the liquid crystal material is a nematic or smectic liquid crystal material,
- the at least one birefringent layer of liquid crystal material is coated on at least one surface of a substrate,
- the substrate is a reflective substrate,
- the reflective substrate is a metallic film, a metallized polymer film, a hot stamping foil or a holographic image,
- the birefringent film further comprises a linear polariser on the side facing away from the substrate,
- said linear polariser comprises a vitrifed, polymerised or crosslinked liquid crystal material with uniform orientation.

In a preferred embodiment, the liquid crystal material exhibits a homeotropic alignment at one side of the film, preferably at the substrate—birefringent layer interface if a substrate is also comprised.

According to this preferred embodiment, those substrates are preferred which induce and/or enhance a homeotropic alignment of the liquid crystal material at the substrate—birefringent layer interface. Among these substrates the reflective ones are particularly preferred. Advantageous reflective substrates are metallic films or metallized polymer films. In addition these substrates may also be part of a hot stamping foil or of a holographic image.

Preferably, the substrate comprises a surface of metal, in particular of aluminium, at the substrate—birefringent layer interface. Especially preferred are substrates with an aluminium surface which induces a homeotropic alignment of the liquid crystal material, such that a multi domain structure and not a single domain is achieved. In general, no special treatment of the aluminium surface is needed, so that this birefringent film can be fabricated economically even in large scales.

The substrate or at least the surface of the substrate coated with the liquid crystal material is preferably flat, like, e.g., a foil, film or sheet, and has preferably a thickness smaller than 200 µm, in particular smaller than 60 µm, most preferably smaller than 20 µm. The substrate is preferably planar, structured, patterned and/or has a relief. The shape, structure, pattern and/or relief of the substrate is preferably adapted to the desired application of the inventive birefringent film. Suitable structuring and patterning techniques are well known to the one skilled in the art, in particular in the fields of precision engineering and microtechnology, and include lithography, etching, cutting, stamping, punching, embossing, molding and electron discharge machining techniques.

It is also possible to use a reflective substrate comprising a hologram or kinegram, a holographic layer with an embossed, patterned or structured surface, or a layer of reflective holographic pigments. Light reflected by higher regions of the structured surface will interfere with light reflected by lower regions of the structured surface, thereby forming a holographic image.

Thus, for example a substrate like, e.g., a banknote, or selected regions thereof, can be printed or coated with a hologram or reflective metal layer, which is then covered by a liquid crystal material showing multi domains with a splayed structure. This embodiment is particularly suitable for use as false-proof security threads or holograms on banknotes or documents of value, providing a security marking by which the banknote is easy to authenticate when viewed through a polariser.

In order to achieve a splayed orientation of the liquid crystals preferably one side of the birefringent film exhibits a homeotropical alignment and the other side shows a planar alignment. For this, the liquid crystal material advantageously comprises at least one compound which induces and/or enhances a planar alignment, preferably opposite to the substrate—birefringent film interface showing a homeotropic alignment. Preferably, this compound is a surfactant, especially a non-ionic surfactant, very preferably a fluorocarbon surfactant, in particular which comprises one or more alkyl or alkoxy groups with 2 to 15 C-atoms, wherein one or more, most preferably all H-atoms are substituted by fluorine. Fluoroalkyl-alkoxylate surfactants are especially suited. Thus, preferred fluorocarbon surfactants are of the formula I

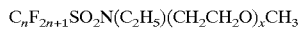

$$C_nF_{2n+1}SO_2N(C_2H_5)(CH_2CH_2O)_xCH_3 \qquad I$$

wherein n is an integer from 4 to 12 and x is an integer from 5 to 15. Therefore, a particularly preferred surfactant is the commercially available fluorocarbon surfactant Fluorad FC-171 (from 3M Co.).

The lower limit of the amount of said compounds inducing said planar alignment is preferably 0.01 weight %, in particular 0.05 weight %, most preferably 0.1 weight % of the liquid crystal material. The upper limit of the amount of said compounds is preferably 5 weight %, in particular 3 weight %, most preferably 1.5 weight % of the liquid crystal material.

The optimum range of the thickness of the birefringent layer depends upon the strength of the birefringence of the liquid crystal material. Thicknesses below the preferred lower limit result in birefringent films which do not show the visible effect of a random pattern as decribed above when viewed through a polariser. It is presumed that in this case there is not sufficient liquid crystalline material to adopt a splayed structure. Thicknesses greater than the preferred upper limit yield birefringent films which show only a block of colour rather than a random pattern when viewed through a polariser. Presumably, greater thicknesses lead to the formation of a mainly planar orientation of the liquid crystals with only a few or even a single domain. Therefore, the one skilled in the art can determine easily the optimum range of the thickness. Birefringent layers with a birefringence in the range from 0.1 to 0.3, generally have a preferred thickness from 0.5 to 20 µm, most preferably 1 to 6 µm (e.g., 2 to 6 µm), especially 1.5 to 5 µm.

The birefringent film according to this invention may comprise one or more further layers. According to the embodiment with a substrate, these layers may be built onto the substrate, opposite to the birefringent layer, and/or onto the birefringent layer.

The said further layers may be chosen according to the desired application of the birefringent film and may have a function, like, e.g., as a protecting layer, support layer, adhesive layer, reflecting layer, optical retardation layer, colour filter and/or as a polarizer.

According to a preferred embodiment, the inventive birefringent film is part of a hot stamping foil. Thus, a hot stamping foil comprising the inventive birefringent film is also an object of this invention. Preferred structures and the assembly of hot stamping foils are described in the GB 2 357 061, which is incorporated herein by reference in its entirety. The substrate of the birefringent film according to the preferred embodiment of this invention corresponds to the reflective layer described in the GB 2 357 061, onto which the layer of liquid crystalline material is applied, which possesses multidomains with a splayed structure to yield the inventive effect.

According to another preferred embodiment, the inventive birefringent film is part of an optical data storage device. Thus, an optical data storage device comprising the inventive birefringent film is also an object of this invention. As the inventive birefringent film does not affect the optical function, it is especially suited to mark such devices, in particular compact discs (CD), which may be read and/or write memory devices for data, like software, audio and/or video data.

In general such compact discs comprise a disk, being made of a transparent plastic material, like poly carbonate. One side of the plastic is metallized, e.g., by a thin aluminium coating, and contains the data in digitized form. The metallized side of the disc is shielded by a coating, which may be printed and contain additional information. According to one variant of this embodiment according to the invention, the inventive birefringent film is directly applied onto the metallized layer of the disc. Hereby, the metallized layer may serve as a substrate onto which the liquid crystal material is coated. The birefringent film may cover one side of the disc completely or only one or more parts of it. Additionally, the disc with the birefringent film may be coated or printed. According to another variant of this invention the birefringent film is directly applied onto the surface of the plastic disc before or after the digitized data are written. Preferably, the birefringent film is manufactured onto the disc by coating with a liquid crystalline material according to the invention. Afterwards, this birefringent side of the disc is metallized and may be coated as known. When viewing from the playing side of the disc through a linear polarizer one can see the non-regular pattern as described. Both variants could also be applied on the same disc.

The birefringent film according to this invention is advantageously prepared by applying a solution of a liquid crystal material onto a substrate and allowing the solvent to evaporate. The LC mixture can be a solution, dispersion or emulsion of the LC material in the solvent. Preferably, a solution is used. The liquid crystal material is preferably applied onto the substate by printing techniques, like, e.g., screen printing, reel-to-reel printing. The LC mixture can also be applied by other methods that are known in the art, like for example ink-jet, offset gravure, by means of a stamp or by spin-coating. The solvent may evaporate with or without the use of external forces such as heat or reduced pressure. In this way, it is possible to prepare multiple birefringent films from one sample of LC material by the same method, wherein each marking has a unique pattern, like a fingerprint, which can be easily identified and is difficult to forge.

The thickness of the LC layer can be altered for example by changing the solvent concentration of the LC mixture. The thickness of the final LC layer thus increases with increasing amount of LC material in the mixture. Furthermore, a wetting agent or a surfactant may be added to the liquid crystal solution to change its surface tension and its adhesion to the substrate. Such a surfactant may be the same surfactant or be added in addition to a surfactant, which is used to induce a planar alignment as described above. Suitable surfactants are described for example in J. Cognard, Mol.Cryst.Liq.Cryst. 78, Supplement 1, 1–77 (1981). Particularly preferred are non-ionic surfactants, such as the commercially available fluorocarbon surfactants Fluorad 171 (from 3M Co.), or Zonyl FSN (from DuPont).

The liquid crystal material is preferably applied onto a substrate, especially a reflective substrate which induces and/or enhances multidomains with a splayed structure as described above. Most preferably the substrate possesses an aluminium surface, like, e.g., an aluminium film or a polymer film with a least one aluminium layer. The advantage of this embodiment is that the liquid crystal material can be applied onto the substrate directly, i.e., generally no additional layer or special treatment to achieve a homeotropic alignment with multi domains is needed. Therefore, this embodiment is particularly suited for large scale fabrication of the inventive birefringent film.

After the preparation as described above, the resulting birefringent film may be released from the substrate and forms a self-supporting, i.e., free-standing foil. According to a preferred embodiment, the birefringent film is left on the substrate. In this case the substrate is preferably a reflective substrate as described above.

The birefringent film according to the present invention exhibits an unregular pattern that is invisible when viewed under unpolarised light and becomes visible only when viewed through a polariser against a reflective background or two polarisers. In an additional embodiment, the birefringent film already comprises a linear polariser on top of the liquid crystal layer. In this case the birefringent film is directly visible to the eye, without the use of a separate polariser when using a reflective background or substrate. Such permanently visible birefringent films are desired for specific applications.

For the linear polariser in principle all materials known in the art are suitable. Thus, e.g. standard linear absorption polarisers can be used comprising an uniaxially stretched polymer film of, e.g., polyvinyl alcohol, or comprising a polymer film into which is incorporated a dichroic dye. It is also possible to use a linear polariser comprising a vitrified, polymerised or crosslinked liquid crystal (LC) material that exhibits macroscopically uniform planar orientation, i.e., with the mesogenic groups of the LC material being oriented substantially parallel to the plane of the layer into a preferred direction. The linear polariser can also be prepared, e.g., by coating a layer of polymerisable LC material comprising a dye onto a substrate, aligning the LC material into planar orientation, i.e., so that the mesogenic groups are oriented parallel to the plane of the layer, polymerising or crosslinking the material by exposure to heat or actinic radiation. Linear polarisers made from polymerisable material by the above method are described in EP 0 397 263 (Philips), the entire disclosure of which is incorporated into this application by way of reference.

The LC material of the birefringent layer is preferably a nematic or smectic LC material. Nematic LC materials are especially preferred.

The liquid crystal material of the birefringent film is preferably a polymerisable or crosslinkable material that is polymerised or crosslinked during or after evaporation of the solvent.

Alternatively, the liquid crystal polymer material is applied onto the substrate as a solution or emulsion in a suitable solvent. LC side chain polymers or LC main chain polymers can be used. LC side chain polymers are especially preferred. For example, LC side chain polymers comprising a polyacrylate, polymethacrylate, polysiloxane, polystyrene or epoxide backbone with laterally attached mesogenic side chains can be used. The polymer may also comprise side chains with reactive groups that can be crosslinked after or during evaporation of the solvent. If polymers with a glass temperature that is higher than ambient temperature are used, evaporation of the solvent leaves a solid LC polymer film. The LC polymer may also be subjected to mechanical or heat treatment after application to the substrate, thereby differences in thickness between the different regions and fomation of the image can be controlled. In case LC polymers with high melting points are used, like, e.g., LC main chain polymers, it is also possible to apply a melt of the LC polymer onto the substrate which solidifies upon cooling.

In case a polymerisable LC material is used, it preferably comprises at least one polymerisable mesogenic compound having one polymerisable functional group and at least one polymerisable mesogenic compound having two or more polymerisable functional groups.

In another preferred embodiment the polymerisable LC material comprises polymerisable mesogenic compounds having two or more polymerisable functional groups (di- or multireactive or di-or multifunctional compounds). Upon polymerisation of such a mixture a three-dimensional polymer network is formed, which is self-supporting and shows a high mechanical and thermal stability and a low temperature dependence of its physical and optical properties. By varying the concentration of the multifunctional mesogenic or non mesogenic compounds the crosslink density of the polymer film and thereby its physical and chemical properties such as the glass transition temperature, which is also important for the temperature dependence of the optical properties of the polymerised film, the thermal and mechanical stability or the solvent resistance can be tuned easily.

The polymerisable mesogenic mono-, di- or multireactive compounds can be prepared by methods which are known per se and which are described, for example, in standard works of organic chemistry such as, for example, Houben-Weyl, Methoden der organischen Chemie, Thieme-Verlag, Stuttgart. Typical examples are described for example in WO 93/22397; EP 0 261 712; DE 19504224; DE 4408171 and DE 4405316. The compounds disclosed in these documents, however, are to be regarded merely as examples that do not limit the scope of this invention.

Examples representing especially useful monoreactive polymerisable mesogenic compounds are shown in the following list of compounds, which should, however, be taken only as illustrative and is in no way intended to restrict, but instead to explain the present invention:

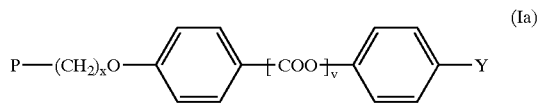
(Ia)

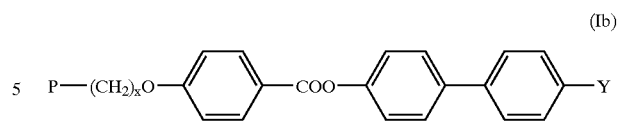
(Ib)

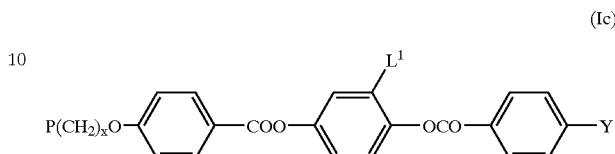
(Ic)

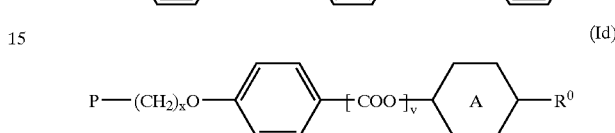
(Id)

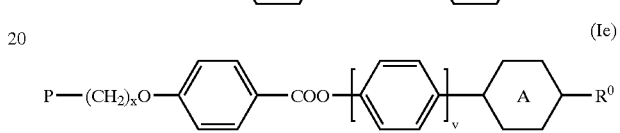
(Ie)

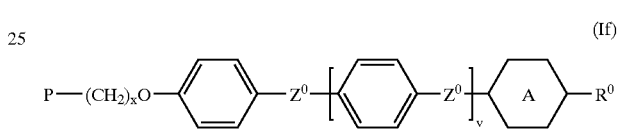
(If)

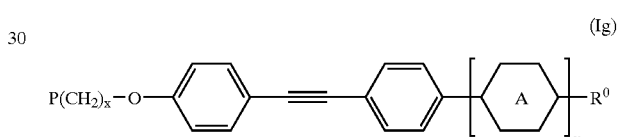
(Ig)

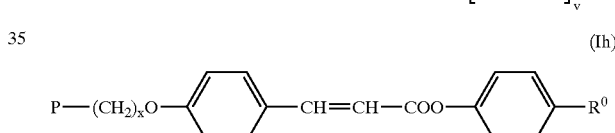
(Ih)

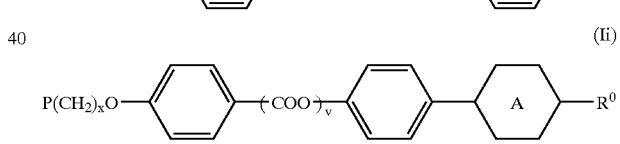
(Ii)

Examples of useful direactive polymerisable mesogenic compounds are shown in the following list of compounds, which should, however, be taken only as illustrative and is in no way intended to restrict, but instead to explain the present invention

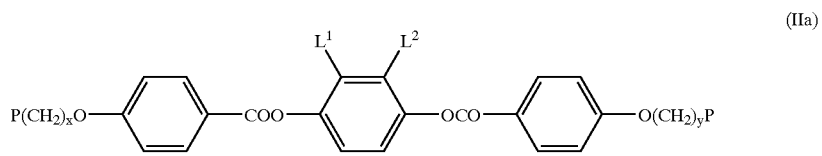
(IIa)

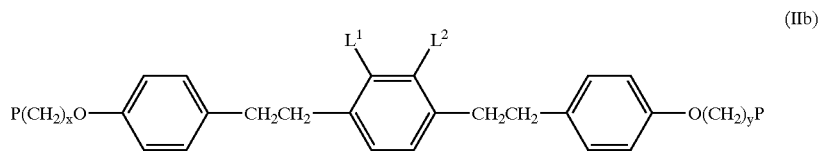
(IIb)

In the above formulae, P is a polymerisable group, preferably an acryl, methacryl, vinyl, vinyloxy, propenyl ether, epoxy or styryl group, x and y are each independently 1 to 12, A is 1,4-phenylene that is optionally mono-, di- or trisubstituted by $L^1$ or 1,4-cyclohexylene, v is 0 or 1, $Z^0$ is —COO—, —OCO—, —CH$_2$CH$_2$— or a single bond, Y is a polar group, $R^0$ is an unpolar alkyl or alkoxy group, and $L^1$ and $L^2$ are each independently H, F, Cl, CN or an optionally halogenated alkyl, alkoxy, alkylcarbonyl, alkoxycarbonyl or alkoxycarbonyloxy group with 1 to 7 C atoms.

The term 'polar group' in this connection means a group selected from F, Cl, CN, NO$_2$, OH, OCH$_3$, OCN, SCN, an optionally fluorinated alkylcarbonyl or alkylcarboxyl group with up to 4 C atoms or a mono-, oligo- or polyfluorinated alkyl or alkoxy group with 1 to 4 C atoms. The term 'unpolar group' means an alkyl group with 1 or more, preferably 1 to 12 C atoms or an alkoxy group with 2 or more, preferably 2 to 12 C atoms.

As described above, the liquid crystal material preferably comprises at least one compound which induces and/or enhances a planar alignment opposite to the substrate-birefringent film interface. Preferably, this compound is a surfactant, most preferably a non-ionic surfactant, in particular a fluoroalkylalkoxylate surfactant, most preferably of the formula I as defined above. An example is the commercially available fluorocarbon surfactant Fluorad FC-171 (from 3M Inc.). Preferred lower and upper limits of the amount of said compounds are given in the foregoing.

Polymerisation of the polymerisable LC material takes place by exposing it to heat or actinic radiation. Actinic radiation means irradiation with light, like UV light, IR light or visible light, irradiation with X-rays or gamma rays or irradiation with high energy particles, such as ions or electrons. Preferably, polymerisation is carried out by UV irradiation. As a source for actinic radiation, for example, a single UV lamp or a set of UV lamps can be used. When using a high lamp power the curing time can be reduced. Another possible source for actinic radiation is a laser, like, e.g., a UV laser, an IR laser or a visible laser.

The polymerisation is carried out in the presence of an initiator absorbing at the wavelength of the actinic radiation. For example, when polymerising by means of UV light, a photoinitiator can be used that decomposes under UV irradiation to produce free radicals or ions that start the polymerisation reaction. When curing polymerisable mesogens with acrylate or methacrylate groups, preferably a radical photoinitiator is used, when curing polymerisable mesogens with vinyl and epoxide groups, preferably a cationic photoinitiator is used. It is also possible to use a polymerisation initiator that decomposes when heated to produce free radicals or ions that start the polymerisation. As a photoinitiator for radical polymerisation, for example, the commercially available Irgacure 651, Irgacure 184, Darocure 1173 or Darocure 4205 (all from Ciba Geigy AG) can be used, whereas in case of cationic photopolymerisation the commercially available UVI 6974 (Union Carbide) can be used. The polymerisable LC material preferably comprises 0.01 to 10%, very preferably 0.05 to 5%, in particular 0.1 to 3% of a polymerisation initiator. UV photoinitiators are preferred, in particular radicalic UV photoinitiators.

The curing time is dependent, inter alia, on the reactivity of the polymerisable mesogenic material, the thickness of the coated layer, the type of polymerisation initiator and the power of the UV lamp. The curing time according to the invention is preferably not longer than 10 minutes, particularly preferably not longer than 5 minutes and very particularly preferably shorter than 2 minutes. For mass production, short curing times of 3 minutes or less, very preferably of 1 minute or less, in particular of 30 seconds or less, are preferred.

The inventive polymerisable liquid crystalline mixtures can additionally comprise one or more other suitable components such as, for example, catalysts, sensitizers, stabilizers, inhibitors, co-reacting monomers, surface-active compounds, lubricating agents, wetting agents, dispersing agents, hydrophobing agents, adhesive agents, flow improvers, defoaming agents, deaerators, diluents, reactive diluents, auxiliaries, colourants, dyes or pigments.

In particular, the addition of stabilizers is preferred in order to prevent undesired spontaneous polymerisation of the polymerisable material for example during storage. As stabilizers in principal all compounds can be used that are known to the skilled in the art for this purpose. These compounds are commercially available in a broad variety. Typical examples for stabilizers are 4-ethoxyphenol or butylated hydroxytoluene (BHT).

Other additives, like, e.g., chain transfer agents, can also be added to the polymerisable LC material in order to modify the physical properties of the resulting polymer film. When adding a chain transfer agent, such as monofunctional thiol compounds like, e.g., dodecane thiol or multifunctional thiol compounds like, e.g., trimethylpropane tri(3-mercaptopropionate), to the polymerisable material, the length of the free polymer chains and/or the length of the polymer chains between two crosslinks in the inventive polymer film can be controlled. When the amount of the chain transfer agent is increased, the polymer chain length in the obtained polymer film is decreasing.

It is also possible, in order to increase crosslinking of the polymers, to add up to 20% of a non mesogenic compound with two or more polymerisable functional groups to the polymerisable LC material alternatively or in addition to the di- or multifunctional polymerisable mesogenic compounds to increase crosslinking of the polymer. Typical examples for difunctional non mesogenic monomers are alkyldiacrylates or alkyldimethacrylates with alkyl groups of 1 to 20 C atoms. Typical examples for non mesogenic monomers with more than two polymerisable groups are trimethylpropanetrimethacrylate or pentaerythritoltetraacrylate.

In another preferred embodiment the mixture of polymerisable material comprises up to 70%, preferably 3 to 50% of a non mesogenic compound with one polymerisable functional group. Typical examples for monofunctional non mesogenic monomers are alkylacrylates or alkylmethacrylates.

It is also possible to add, for example, a quantity of up to 20% by weight of a non polymerisable liquid-crystalline compound to adapt the optical properties of the resulting polymer film.

The polymerisation is preferably carried out in the liquid crystal phase of the polymerisable LC material. Therefore, preferably polymerisable mesogenic compounds or mixtures with low melting points and broad liquid crystal phase ranges are used. The use of such materials allows to reduce the polymerisation temperature, which makes the polymerisation process easier and is a considerable advantage especially for mass production. The selection of suitable polymerisation temperatures depends mainly on the clearing point of the polymerisable material and inter alia on the softening point of the substrate. Preferably, the polymerisation temperature is at least 30 degrees below the clearing temperature of the polymerisable mesogenic mixture. Polymerisation temperatures below 120° C. are preferred. Especially preferred are temperatures below 90° C., in particular temperatures of 60° C. or less.

The birefringent films according to the present invention are especially suitable for use in hot stamping foils and holographic foils for the preparation of security markings and security threads. The preparation of holographic layers is described, e.g., in U.S. Pat. No. 4,588,664, the entire disclosure of which is incorporated into this application by way of reference.

Furthermore, for decorative applications the birefringent film according to the invention can be directly applied to decorating objects, car bodies or any object with a reflective surface by the method described above. Thus, metal objects like, e.g., car bodies, household objects, lamps or other objects can be coated or printed directly with an LC mixture according to the inventive method.

The inventive birefringent film can be used for direct application, as security thread, hologram or hot stamping foil for decorative or security applications, to authenticate and prevent counterfeiting of documents of value, for identification of hidden images, informations or patterns. They can be applied to consumer products or household objects, car bodies, foils, packing materials, clothes or woven fabric, incorporated into plastic, or applied as security markings or threads on documents of value like banknotes, credit cards or ID cards, national ID documents, licenses or any product with money value, like stamps, tickets, shares, cheques, etc.

Without further elaboration, it is believed that one skilled in the art can, using the preceding description, utilize the present invention to its fullest extent. The following examples are, therefore, to be construed as merely illustrative and not limitative of the remainder of the disclosure in any way whatsoever.

In the foregoing and in the following examples, unless otherwise indicated, all temperatures are set forth uncorrected in degrees Celsius and all parts and percentages are by weight.

The entire disclosure of all applications, patents and publications, cited above and below, and of corresponding European Application No. 02002007.9, filed Feb. 6, 2002 is hereby incorporated by reference.

EXAMPLES

Example 1

The following polymerisable mixture is prepared

| | |
|---|---|
| Compound (A) | 12.01% |
| compound (B) | 30.29% |
| compound (C) | 28.07% |
| compound (D) | 22.70% |
| Irgacure 907 | 6.36% |
| Fluorad FC 171 | 0.57% |

(A)
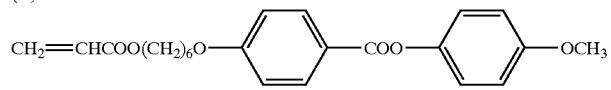

(B)
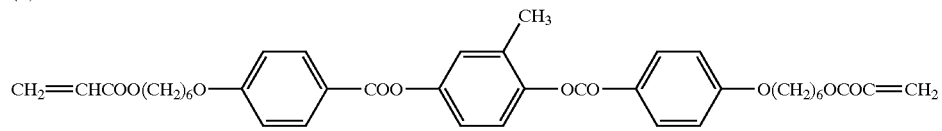

(C)
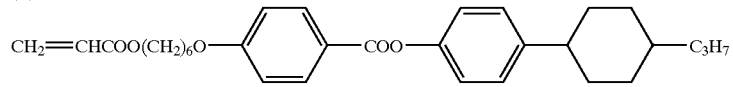

(D)
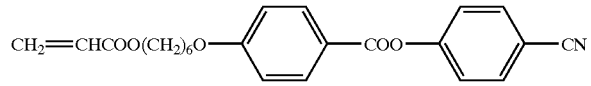

Compounds (A), (B) and (D) can be prepared according to or in analogy to the methods described in D. J. Broer et al., Makromol. Chem. 190, 3201–3215 (1989). Compound (C) and its preparation are described in GB 2,280,445. Irgacure 907 is a commercially available photoinitiator (Ciba Geigy). Fluorad FC 171 is a commercially available surfactant (3M Inc.).

A 15 weight-% solution of the polymerizable mixture in xylene is prepared and filtered through a 0.1 µm filter. The solution is then coated onto the metallised surface of a black PET film of a thickness of 12 µm, which is metallised with aluminium (200 nm), using a reverse gravure technique. The coated film is left to stand for about 1 minute to allow the solvent to evaporate, leaving behind a liquid crystalline coating. The coating is then cured in an air environment at room temperature. The coating and curing gives a polymer film with a uniform appearance when viewed normally but a patterned effect is seen when viewed through a linear polariser. This pattern rotates upon rotation of the polariser. This effect is only seen when the coating thickness is greater than about 1.5 µm. Thicknesses less than this give no visible effect when viewed through a polariser. Thicknesses greater than about 5 µm give an effect but with a block of colour rather than a random pattern.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A birefringent film comprising at least one birefringent layer of liquid crystal material wherein said liquid crystal material forms multi domains with a splayed structure.

2. A birefringent film according to claim 1, wherein the liquid crystal material is a vitrified, polymerised or crosslinked liquid crystal material.

3. A birefringent film according to claim 2, wherein the liquid crystal material is a nematic or smectic liquid crystal material.

4. A birefringent film according to claim 2, wherein the liquid crystal material is made from a polymerisable liquid crystal material comprising at least one polymerisable mesogenic compound having one polymerisable functional group and at least one polymerisable mesogenic compound having two or more polymerisable functional groups.

5. A birefringent film according to claim 4, wherein said at least one polymerisable mesogenic compound having one polymerisable functional group is selected from the following formulae Ia–Ii and said at least one polymerisable mesogenic compound having two or more polymerisable functional groups is selected from formulae IIa–IIb:

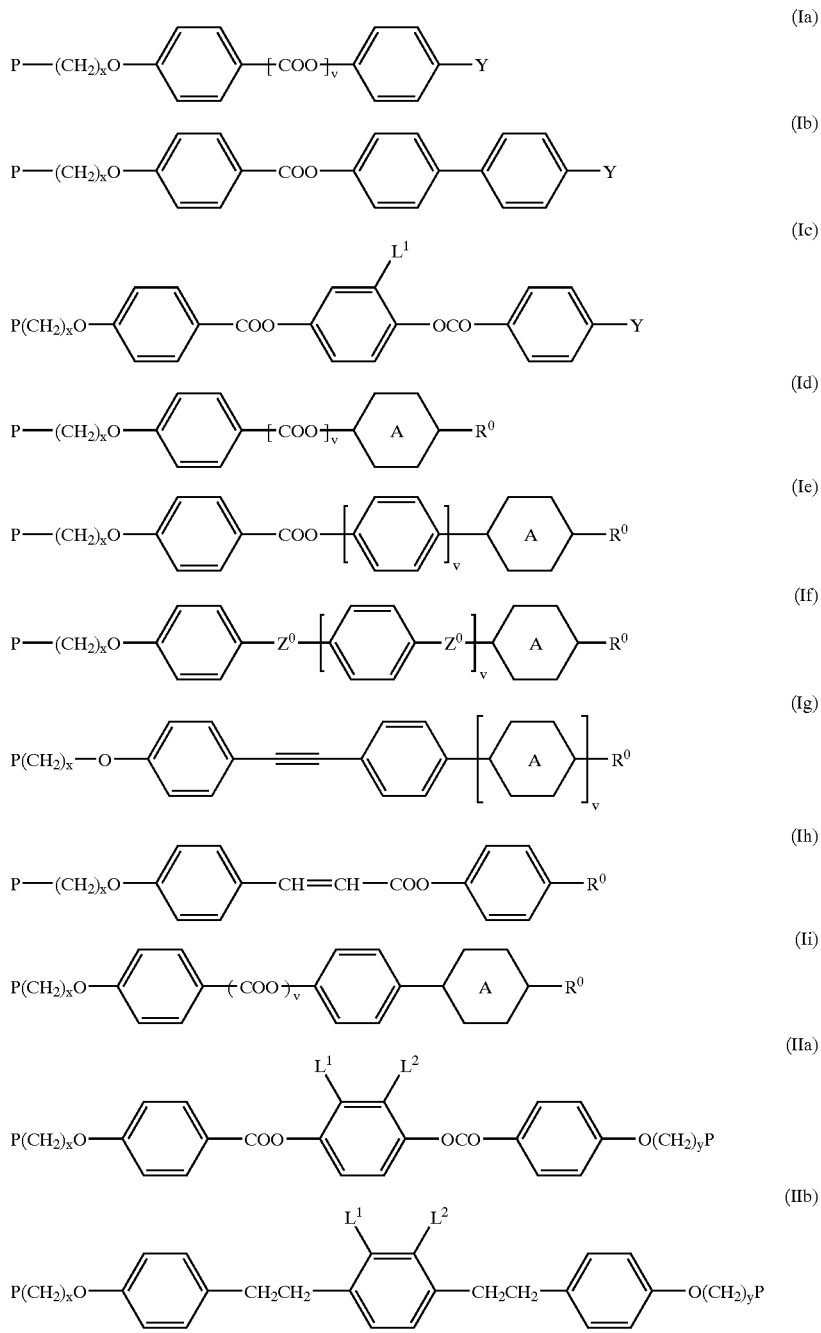

wherein
P is a polymerisable group,
x and y are each independently 1 to 12,
A is 1,4-cyclohexylene or 1,4-phenylene that is optionally mono-, di- or trisubstituted by $L^1$,
v is 0 or 1,
$Z^0$ is —COO—, —OCO—, —CH$_2$CH$_2$— or a single bond,
Y is a polar group selected from F, Cl, CN, NO$_2$, OH, OCH$_3$, OCN, SCN, an optionally fluorinated alkylcarbonyl or optionally fluorinated alkylcarboxyl group with up to 4 C atoms, or a mono-, oligo- or polyfluorinated alkyl or alkoxy group with 1 to 4 C atom,
$R^0$ is an unpolar alkyl having 1 to 12 C atoms or alkoxy group having 2 to 12 C atoms, and
$L^1$ and $L^2$ are each independently H, F, Cl, CN, an optionally halogenated alkyl with 1 to 7 C atoms, an optionally halogenated alkoxy with 1 to 7 C atoms, an optionally halogenated alkylcarbonyl with up to 7 C atoms, an optionally halogenated alkoxycarbonyl with up to 7 C atoms, or an optionally halogenated alkoxycarbonyloxy with up to 7 C atoms.

6. A birefringent film according to claim 5, wherein P is in each case an acryl, methacryl, vinyl, vinyloxy, propenyl ether, epoxy or styryl group.

7. A birefringent film according to claim 1, wherein the liquid crystal material is a nematic or smectic liquid crystal material.

8. A birefringent film according to claim 1, wherein said at least one birefringent layer of liquid crystal material is coated on at least one surface of a substrate.

9. A birefringent film according to claim 8, wherein the liquid crystal material exhibits a homeotropic alignment at the substrate—birefringent layer interface.

10. A birefringent film according to claim 9, wherein the substrate is a reflective substrate.

11. A birefringent film according to claim 8, wherein the substrate is a reflective substrate.

12. A birefringent film according to claim 8, wherein the substrate is a hot stamping foil or a holographic image.

13. A birefringent film according to claim 8, wherein the substrate comprises a surface of metal at the substrate—birefringent layer interface.

14. A birefringent film according to claim 8, wherein the birefringent layer is printed onto the substrate.

15. A birefringent film according to claim 1, wherein the liquid crystal material comprises at least one compound which induces and/or enhances a planar alignment.

16. A birefringent film according to claim 15, wherein the compound inducing and/or enhancing a planar alignment is a surfactant.

17. A birefringent film according to claim 1, wherein the birefringent layer has a thickness of about 1 to 6 $\mu$m.

18. In a decorative, security, authentification and/or identification application using a birefringent film, the improvement wherein the birefringent film is according to claim 1.

19. In a security, authentification or identification marking, thread or device comprising a birefringent film, the improvement wherein the birefringent film is according to claim 1.

20. In a document of value, hot stamping foil, reflective foil and/or optical data storage device comprising at least one birefringent film, the improvement wherein the birefringent film is according to claim 1.

21. An assembly comprising a polarizer, a birefringent film according to claim 1, and a reflection layer.

22. An arrangement comprising a substrate and a security device applied to said substrate, said security device comprising an adhesive layer, a birefringent film according to claim 1, an optional protective layer on top of said birefringent film, and an optional reflection layer between said birefringent film and said substrate.

23. An arrangement according to claim 22, wherein said substrate is a document of value or an identification document.

24. An arrangement according to claim 23, wherein said substrate is a document of value which is a banknote, check, credit card or stock certificate.

25. An arrangement according to claim 23, wherein said substrate is an identification document which is an a ID card or passport.

26. A hot stamping foil comprising a layer of hot melt adhesive, a reflective layer, a birefringent film according to claim 1, a clear or collared lacquer layer, a release layer, and a support film.

27. An assembly comprising a first polarizer, a birefringent film according to claim 1, and a second polarizer.

28. A birefringent film according to claim 1, wherein the each of the multi domains has an area of 1 mm$^2$ to less than 100 mm$^2$.

29. A birefringent film according to claim 1, wherein the each of the multi domains has an area of 1 mm$^2$ to less than 10 mm$^2$.

30. A birefringent film according to claim 1, wherein said liquid crystal material contains at least one surfactant compound which induces and/or enhances a planar alignment.

31. A birefringent film according to claim 30, wherein said at least one surfactant compound is a non-ionic surfactant.

32. A birefringent film according to claim 30, wherein said at least one surfactant compound is a fluorocarbon surfactant are of formula I $$C_nF_{2n+1}SO_2N(C_2H_5)(CH_2CH_2O)_xCH_3 \qquad I$$

wherein n is an integer from 4 to 12 and x is an integer from 5 to 15.

33. A birefringent film according to claim 32, wherein the amount of said surfactant compounds is 0.01–5 weight % of the liquid crystal material.

34. A birefringent film according to claim 30, wherein the amount of said surfactant compounds is 0.01–5 weight % of the liquid crystal material.

35. A birefringent film according to claim 1, wherein the birefringence is in the range from 0.1 to 0.3 and the film has a thickness of from 0.5 to 20 $\mu$m.

36. A method for preparing a birefringent film comprising applying a solution of a liquid crystal material onto a substrate and allowing the solvent to evaporate, wherein said liquid crystal material forms multi domains with a splayed structure.

37. A method according to claim 36, wherein the liquid crystal material is a polymerisable or crosslinkable material that is polymerised or crosslinked after applying it onto the substrate.

38. A method according to claim 36, wherein the liquid crystal material is applied onto the substrate by printing.

* * * * *

UNITED STATES PATENT AND TRADEMARK OFFICE
CERTIFICATE OF CORRECTION

PATENT NO. : 6,924,861 B2  Page 1 of 1
APPLICATION NO. : 10/358346
DATED : August 2, 2005
INVENTOR(S) : Robert Hammond-Smith et al.

It is certified that error appears in the above-identified patent and that said Letters Patent is hereby corrected as shown below:

Front page, section (75) reads " Corfe Mullen (GB)" should read -- Willborne (GB) --

Column 18, line 16, reads "is an a ID" should read -- is an ID --

Column 18, line 20, reads "clear or collared" should read -- clear or colored --

Column 18, claim 28, line 24, delete "the"

Column 18, claim 29, line 27, delete first "the"

Column 18, claim 32, line 38, delete "are"

Signed and Sealed this

Twenty-eighth Day of November, 2006

JON W. DUDAS
*Director of the United States Patent and Trademark Office*